(12) United States Patent
Yang et al.

(10) Patent No.: US 11,516,728 B2
(45) Date of Patent: Nov. 29, 2022

(54) METHOD AND SYSTEM FOR ACCESS CONTROL WITH DIFFERENTIATED SERVICE

(71) Applicant: Verizon Patent and Licensing Inc., Basking Ridge, NJ (US)

(72) Inventors: Jin Yang, Orinda, CA (US); Matthew Nelson, Pleasanton, CA (US); Sudhakar Reddy Patil, Flower Mound, TX (US); Xin Wang, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1 day.

(21) Appl. No.: 17/187,991

(22) Filed: Mar. 1, 2021

(65) Prior Publication Data
US 2022/0279424 A1    Sep. 1, 2022

(51) Int. Cl.
*H04W 4/08*      (2009.01)
*H04W 48/04*     (2009.01)
*H04W 8/18*      (2009.01)
*H04W 84/04*     (2009.01)

(52) U.S. Cl.
CPC ............ *H04W 48/04* (2013.01); *H04W 4/08* (2013.01); *H04W 8/186* (2013.01); *H04W 84/042* (2013.01)

(58) Field of Classification Search
CPC ................................ H04W 48/04; H04W 4/08
See application file for complete search history.

(56) References Cited

U.S. PATENT DOCUMENTS

2018/0124680 A1* 5/2018 Dhanda ................. H04W 48/06
2019/0357119 A1* 11/2019 Hong .................... H04L 1/1614

* cited by examiner

*Primary Examiner* — Michael T Vu

(57) ABSTRACT

A method, a device, and a non-transitory storage medium are described in which an access control with differentiated service is provided. The service may provide access barring information that includes an access class and a group identifier. The access class and group identifier may constitute an access category identifier that identifies an access category under a unified access control (UAC). The access class and group identifier may correlate to a type of access attempt and/or condition related to the end device. The access class and group identifier may pertain to end device access via a non-standalone deployment.

20 Claims, 8 Drawing Sheets

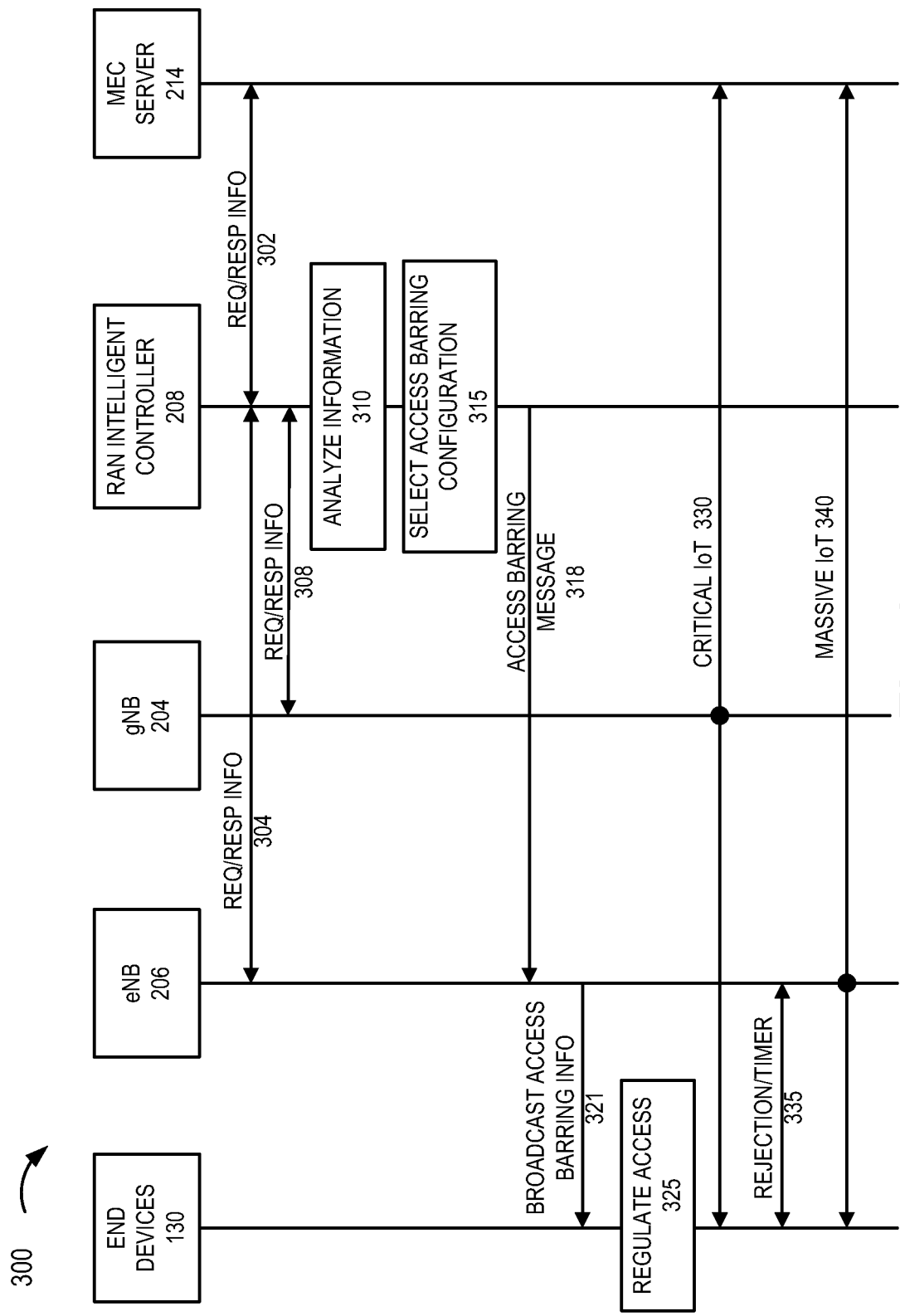

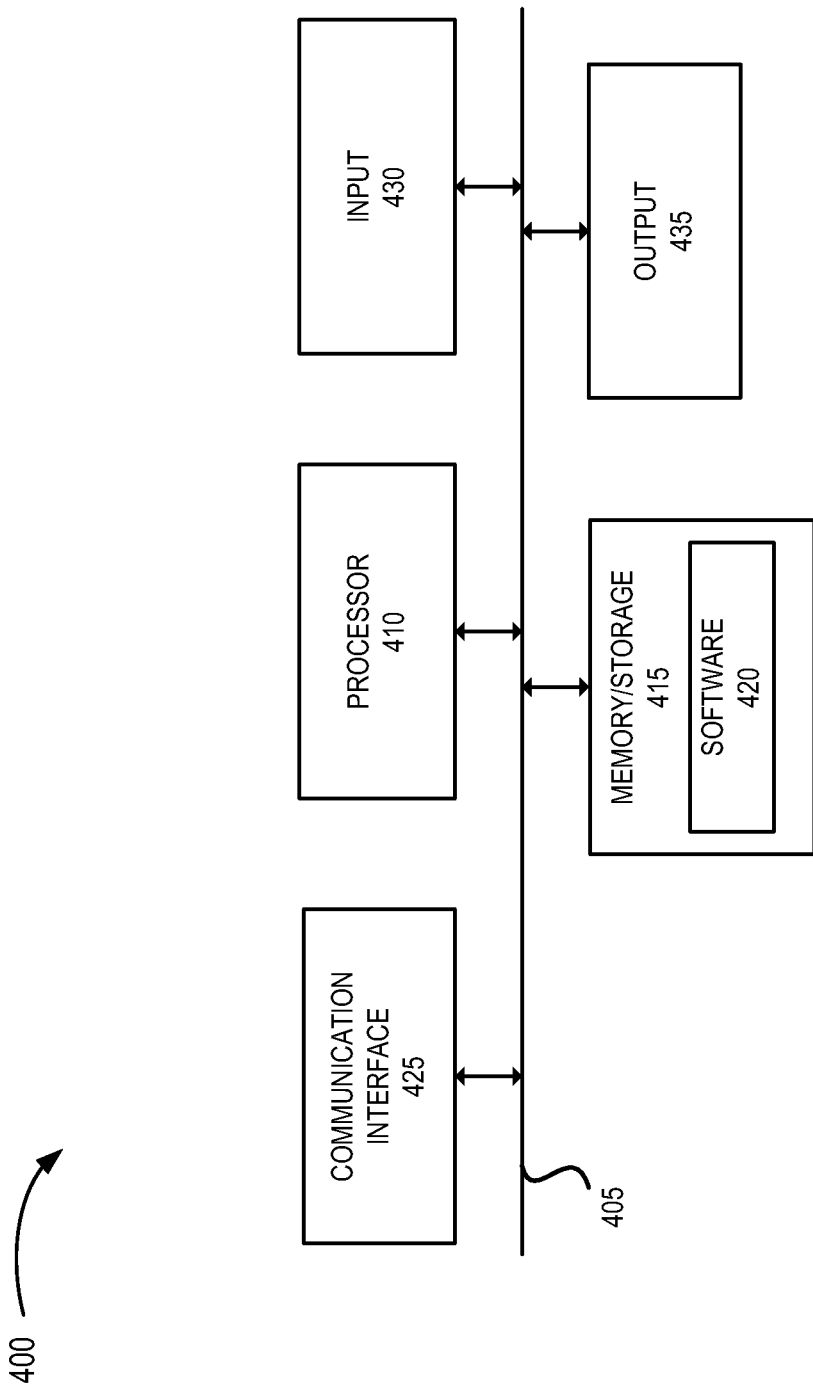

METHOD AND SYSTEM FOR ACCESS CONTROL WITH DIFFERENTIATED SERVICE

BACKGROUND

Development and design of networks present certain challenges from a network-side perspective and an end device perspective. For example, Centralized Radio Access Network (C-RAN), Open Radio Access Network (O-RAN), split RAN, stand-alone (SA), and non-stand-alone (NSA) architectures have been proposed to satisfy the increasing complexity, transitioning from Fourth Generation (4G) to Fifth Generation (5G) networks, densification, and demands of end device application services of a future generation network.

BRIEF DESCRIPTION OF THE DRAWINGS

FIG. 3 is a diagram illustrating an exemplary process of an exemplary embodiment of access control with differentiated service;

FIG. 4 is a diagram illustrating exemplary components of a device that may correspond to one or more of the devices illustrated and described herein;

DETAILED DESCRIPTION

Figure 1:
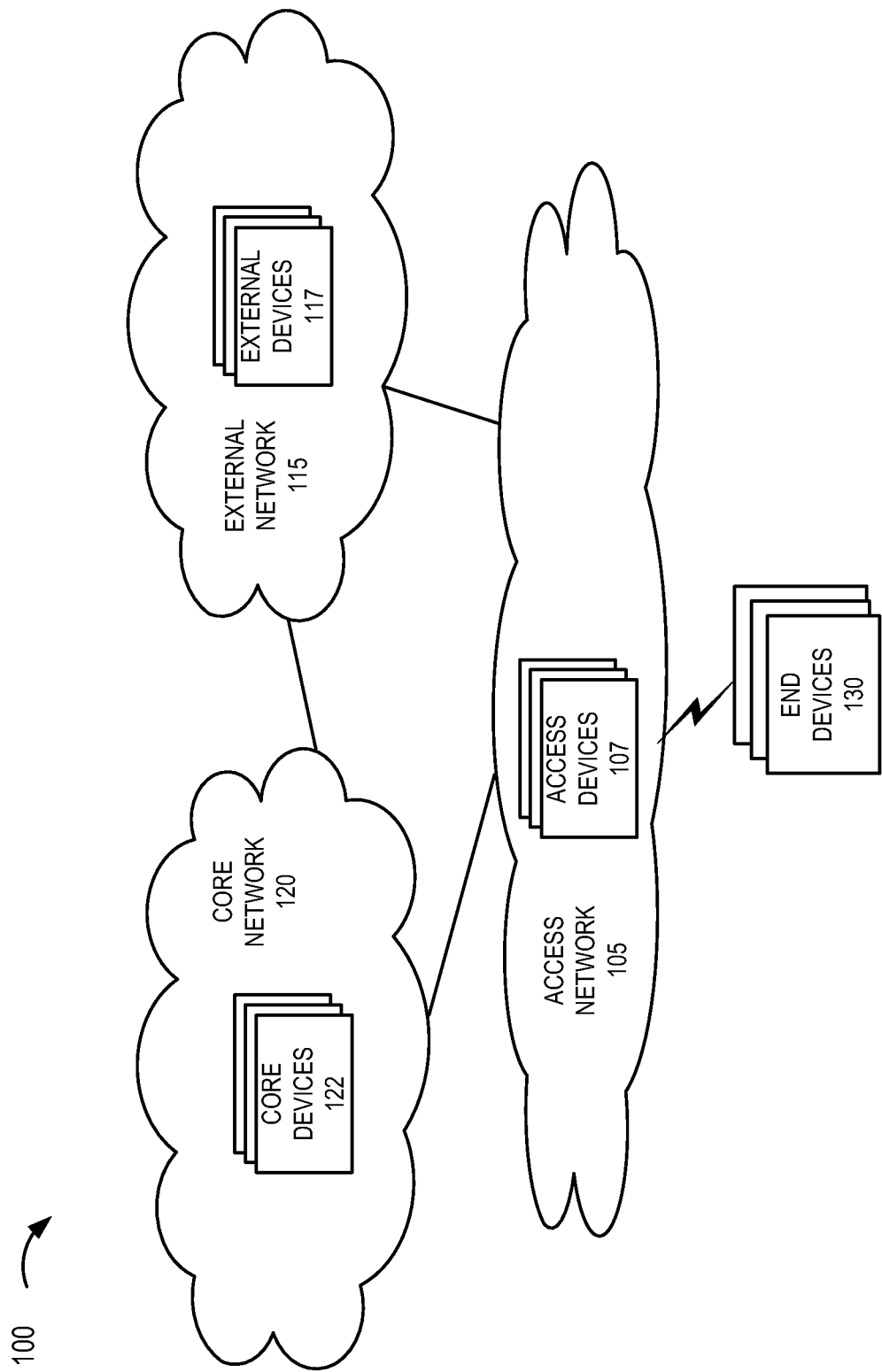
FIG. 1 is a diagram illustrating an exemplary environment in which an exemplary embodiment of an access control with differentiated service may be implemented.

The following detailed description refers to the accompanying drawings. The same reference numbers in different drawings may identify the same or similar elements. Also, the following detailed description does not limit the invention.

For 5G and beyond networks, a unified access control (UAC) mechanism has been contemplated. Under the UAC framework, a (wireless) end device may be configured with an access identity number (AIN) ranging from 0-15. For example, the access identity number may indicate an access class configured for the end device or an end device that is configured for a service (e.g., a mission critical service (MCS), a multimedia priority service (MPS), etc.). Additionally, when the end device attempts to connect to the network, the connection attempt may link to an access category number (ACN). For example, an access category number may correlate to a condition related to the end device and a particular type of access attempt (e.g., emergency, mobile originating (MO) Multimedia Telephone (MMTel) video call, MMTel voice call, short messaging service (SMS), mobile originating (MO) signaling on non-access stratum (NAS) level resulting from other than paging, or other type of access attempt). These and other barring and congestion mechanisms may be defined by network administrators or a standard development entity, such as Third Generation Partnership Project (3GPP) and the like, for example. 3GPP has specified, for example, access identities and access categories in TS 34.501 v15.6.0 (2019-12), which is incorporated by reference herein for the sake of further explanatory description.

Under 4G, Long Term Evolution (LTE), and/or other legacy networks, access class barring mechanisms are based on access classes (AC). For example, access classes 0-9 may be assigned to regular end devices in which their access are controlled by an access class barring factor and an access class barring time. Access classes 10-15 are special categories and may relate to an emergency call and other priority services or uses, such as emergency, security, public land mobile network (PLMN) use or staff, and public utilities. According to some standards, for example, access identifies 11-15 of UAC may correlate directly to the access classes 11-15 of the LTE/4G access class barring mechanism.

Despite these access barring mechanisms, a wireless network may not provide suitable access control for NSA deployments and correspondingly the end devices. For example, the end device may connect to both a 4G RAN device (e.g., an evolved Node B (eNB)) and a 5G RAN device (e.g., a next generation Node B (gNB)). Under a standard for UAC, for example, there may be up to 64 access categories while 4G access barring may be limited to 16 access classes. Thus, a 5G UE may be allowed to access a 4G RAN eNB through a control channel, but could be out of resources at a 5G RAN gNB as gNB capacity in terms of number of connections may be less than the eNB.

According to exemplary embodiments, an access control with differentiated service is described. According to an exemplary embodiment, the access control with differentiated service may be implemented in a RAN device. For example, the RAN device may be an eNB or another type of RAN device, as described herein. According to an exemplary embodiment, access control with differentiated service may support NSA deployments. According to another exemplary embodiment, access control with differentiated service may support NSA and SA deployments.

According to an exemplary embodiment, the access control with differentiated service may provide access barring information that includes an access class and a group identifier. For example, the access class may be implemented as a 4G or LTE access class pertaining to the end device. Additionally, the group identifier may be implemented as a string (e.g., numeric, alpha-numeric, alphabetic, etc.) that may identify a set of end devices. For example, the group identifier may be implemented as a subscriber group identifier, a PLMN identifier, or some other suitable group identifier.

According to an exemplary embodiment, the access barring information may be used as an access category of the UAC (e.g., a 5G or new radio (NR) UAC, or a future generation UAC). For example, the access category numbers between 32-63 of the UAC may be operator defined. The access class and group identifier may constitute an access category identifier that identifies an access category under the UAC. Additionally, as a part of the access category, the access class and group identifier may correlate to a type of access attempt and/or condition related to the end device. As an example, the access class and group identifier may correlate to a category of an application service (e.g., an automation application service, an IoT application service, a real-time (RT) application service, etc.), a sub-category of an application service (e.g., industrial automation, consumer IoT (CIoT) application service, etc.), a performance metric (e.g., minimum, maximum, guaranteed, and/or other quantifier pertaining to latency, throughput, bitrate, error rate, etc.), and/or another criterion that may indicate or identify a type of access attempt (e.g., mobile originating (MO) signaling or another type of configured criterion). Additionally, or alternatively, the access class and group identifier may correlate to certain conditions, such as conditions applicable to other access categories, exempt from conditions applicable to another access category, and/or so forth, as described herein.

According to an exemplary embodiment, a RAN controller device may determine access barring for end devices. The RAN controller may determine the access barring based on, for example, current and/or predictive loads (e.g., RAN loads, core network loads, application layer loads, and/or another type of network resource load), subscription information (e.g., user profiles, etc.) and/or other configurable criterion. The RAN controller may control access class barring in a network via other RAN devices, such as an eNB or another suitable RAN device. For example, the RAN device may transmit access barring information of the access control with differentiated service to end devices. The end devices may receive the access barring information and manage their access to a network in accordance therewith.

In view of the foregoing, access control with differentiated service may provide access barring for NSA deployments under a UAC configuration. For example, access control with differentiated service may afford differentiated access control for end devices of an NSA deployment relative to end devices of an SA deployment. Also, access control with differentiated service may expand access control of a 4G access control system (e.g., 16 access classes) to a larger number of distinct access classes and types of access. Access control with different service may also provide a RAN controller service that provides access control and barring for a multi-radio access technology (RAT) RAN based on the access barring information, as described herein.

FIG. 1 is a diagram illustrating an exemplary environment 100 in which an exemplary embodiment of access control with differentiated service may be implemented. As illustrated, environment 100 includes access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or other type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a 5G-access network (5G-AN) or a 5G-RAN, a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120. According to an exemplary embodiment, access network 105 may provide access control with differentiated service, as described herein.

Access network 105 may include different and multiple functional splitting, such as options 1, 2, 3, 4, 5, 6, 7, or 8 that relate to combinations of access network 105 and core network 120 including an EPC network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, SA, etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA NR, SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved LTE (eLTE) evolved Node B (eNB), an eNB, a radio network controller (RNC), a remote radio head (RRH), a baseband unit (BBU), an RU, a CU, a CU control plane (CU CP), a CU user plane (CU UP), a DU, a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device. Access device 107 may include a controller device. For example, access device 107 may include a RAN Intelligent Controller (MC).

According to various exemplary embodiments, one or multiple types of access devices 107 may provide access control with differentiated service, as described herein. For example, an eNB, access device 107 that includes an RU, a DU, and/or a CU that has an LTE air interface, or another type of access device 107 (e.g., eLTE eNB, a home eNB, or other type of wireless station that provides LTE RAN service). According to an exemplary embodiment, a RIC may provide access control with differentiated service, as described herein.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth. Depending on the implementation, access device 107 may provide a wireless access service at a cell, a sector, a sub-sector, carrier, and/or other configurable level.

External network 115 may include one or multiple networks of one or multiple types and technologies. For example, external network 115 may be implemented to include a service or an application-layer network, a cloud network, a private network, a public network, a multi-access edge computing (MEC) network (also known as a mobile edge computing network), a fog network, the Internet, a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application, service, or asset (also referred to as an "application service").

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 120 may include one or multiple networks of one or multiple network types and technologies. Core network 120 may include a complementary network of access network 105. For example, core network 120 may be implemented to include an NGC network, an EPC of an LTE network, an LTE-Advanced (LTE-A) network, and/or an LTE-A Pro network, a future generation core network (e.g., a 6G or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), an NSSF, a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130. According to an exemplary embodiment, end device 130 may provide access control with differentiated service, as described herein.

Figure 2A:
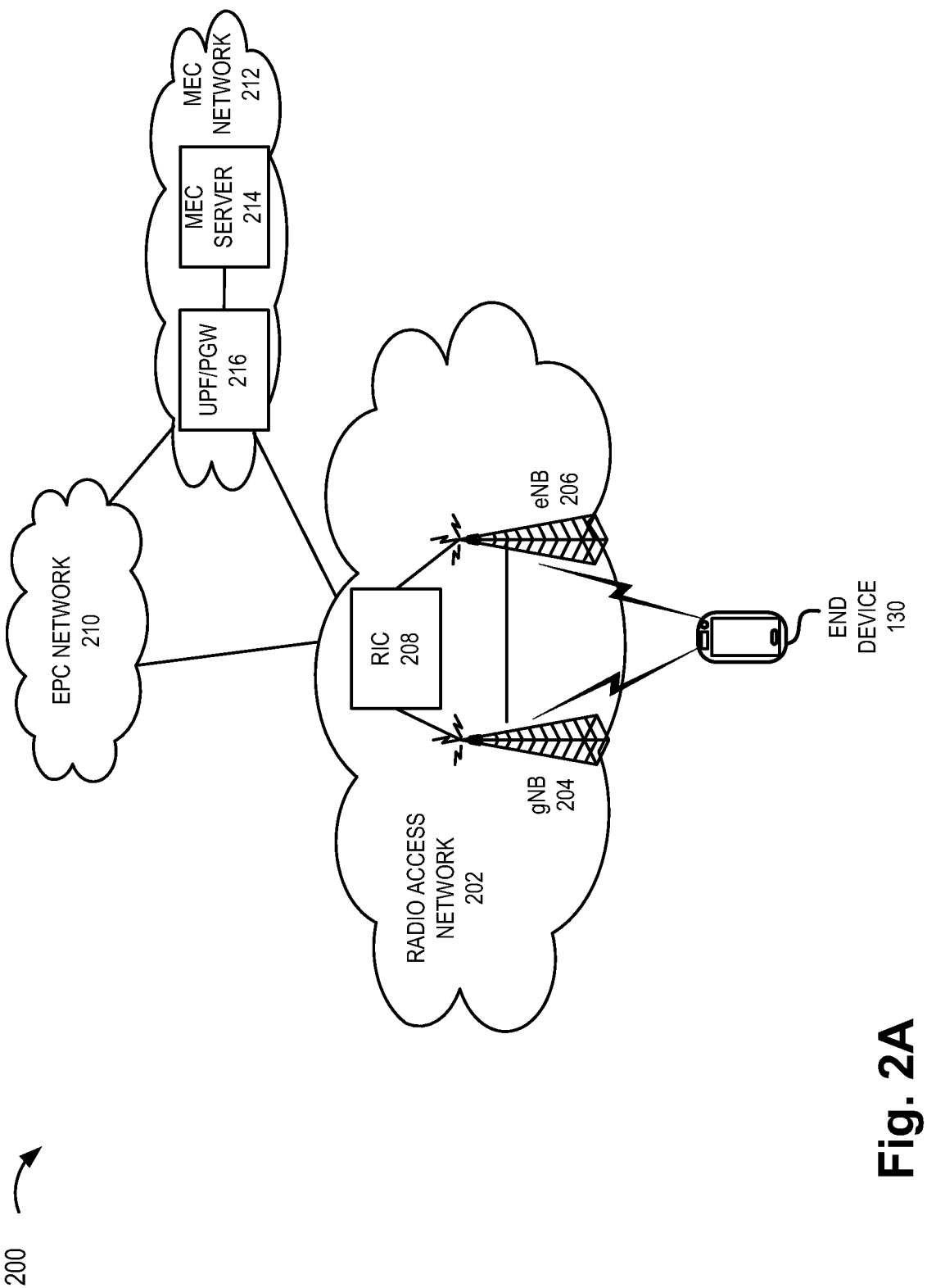
FIG. 2A is a diagram illustrating another exemplary environment in which an exemplary embodiment of access control with differentiated service may be implemented.

FIG. 2A is a diagram illustrating another exemplary environment 200 in which an exemplary embodiment of access control with differentiated service may be implemented. Environment 200 may include an exemplary implementation of an NSA deployment.

As illustrated, environment 200 includes end device 130, exemplary access devices 107 of a radio access network 202, such as a gNB 204, an eNB 206, and a RIC 208, an exemplary core network 120, such as an EPC network 210, and exemplary external devices 117 of a MEC network 212, such as a MEC server 214 and a UPF/PGW 216. The number and type of access devices 107, core devices 122, and external devices 117 illustrated in FIG. 2 are exemplary. The number and type of access network 105, core network 120, and external network 115 are exemplary. Additionally, the number, arrangement, and type of connections between the devices and between networks are exemplary.

According to other exemplary embodiments of access control with differentiated service, the NSA deployment may be different from that depicted in FIG. 2. For example, an Option 4, an Option 7, or another deployment of NSA may be implemented that includes a 5G core network or future generation core network. Additionally, various deployments of NSA may be different based on user plane and control plane connections between access devices 107, between access devices 107 and end device 130, and between access devices 107 and core network 120 (e.g., Options 3, 3a, 3x, 4, 7, etc.) or another configuration for NSA.

As further illustrated, according to an exemplary embodiment, gNB 204 and eNB 206 may each have a communication link with RIC 208. RIC 208 may control and optimize gNB 204 and eNB 206 in providing a wireless access service. RIC 208 may include logic that provides near real-time intelligent radio resource management, quality of service (QoS) management, connectivity management, and handover management in radio access network 202, for example. RIC 208 may include logic that provides non-real-time radio access management. RIC 208 may include artificial intelligence (AI) and/or machine learning (ML) logic to provide control, management, and/or optimization services.

As previously described, according to an exemplary embodiment, RIC 208 may include logic that provides an exemplary embodiment of access control and differentiated service, as described herein. For example, RIC 208 may determine access and barring for end device 130 based on current and/or predictive state information pertaining to access network 105 and access devices 107, such as radio access network 202, gNB 204, and eNB 206. RIC 208 may make this determination based on other state information, such as from core network 120 (e.g., EPC network 210), external network (e.g., MEC network 212), external devices 117 (e.g., MEC server 214, UPF/PGW 216), core devices 122, and/or another type of network device (e.g., a network performance device, etc.). The state information may include load or utilization values and/or available resource values pertaining to various types of resources (e.g., physical, virtual, logical, hardware, software, communication interfaces, etc.) associated with network devices and communication links (e.g., wireless, wired, optical, etc.), radio resources, information pertaining to data radio bearers, uplink and downlink channels, and so forth. The state information may include other types of data, such data indicating a key performance indicator (KPI), a performance metric value (e.g., delay, throughput), a level of congestion data (e.g., low, medium, high, or other value), and/or data indicating a current and/or predictive network condition attributable to congestion. The state information may also include number of service requests (e.g., new RRC requests, application service requests, attachment requests, etc.) received over a period of time. RIC 208 may also determine access and barring for end device 130 based on subscription and/or user profile information pertaining to end device 130 and/or a user associated with end device 130.

According to an exemplary embodiment, RIC 208 may select access barring information in accordance with an analysis of the state information, and optionally other information. According to an exemplary embodiment of access control with differentiated service, access barring information may include an access category identifier associated with a UAC mechanism in which the access category identifier includes a first identifier and a second identifier. According to an exemplary embodiment, the first identifier may be a 4G or LTE access class value or an access identity value (e.g., access identity number of a 5G UAC or other access identifier of a 5G or beyond network) of the UAC mechanism. According to an exemplary embodiment, the second identifier may be a subscriber group identifier, a PLMN identifier, or another type of string (e.g., numeric, alpha-numeric, alphabetic, hexadecimal, etc.), which may be unique. According to an exemplary embodiment, the access barring information may include other information that correlates to the access category identifier. For example, the access category identifier may correlate to a type of access and conditions pertaining to an end device. According to another example, the access category identifier may correlate to a type of access or conditions pertaining to an end device. For example, it could be associated with an emergency voice service, video services, or public safety applications.

Figure 2B:
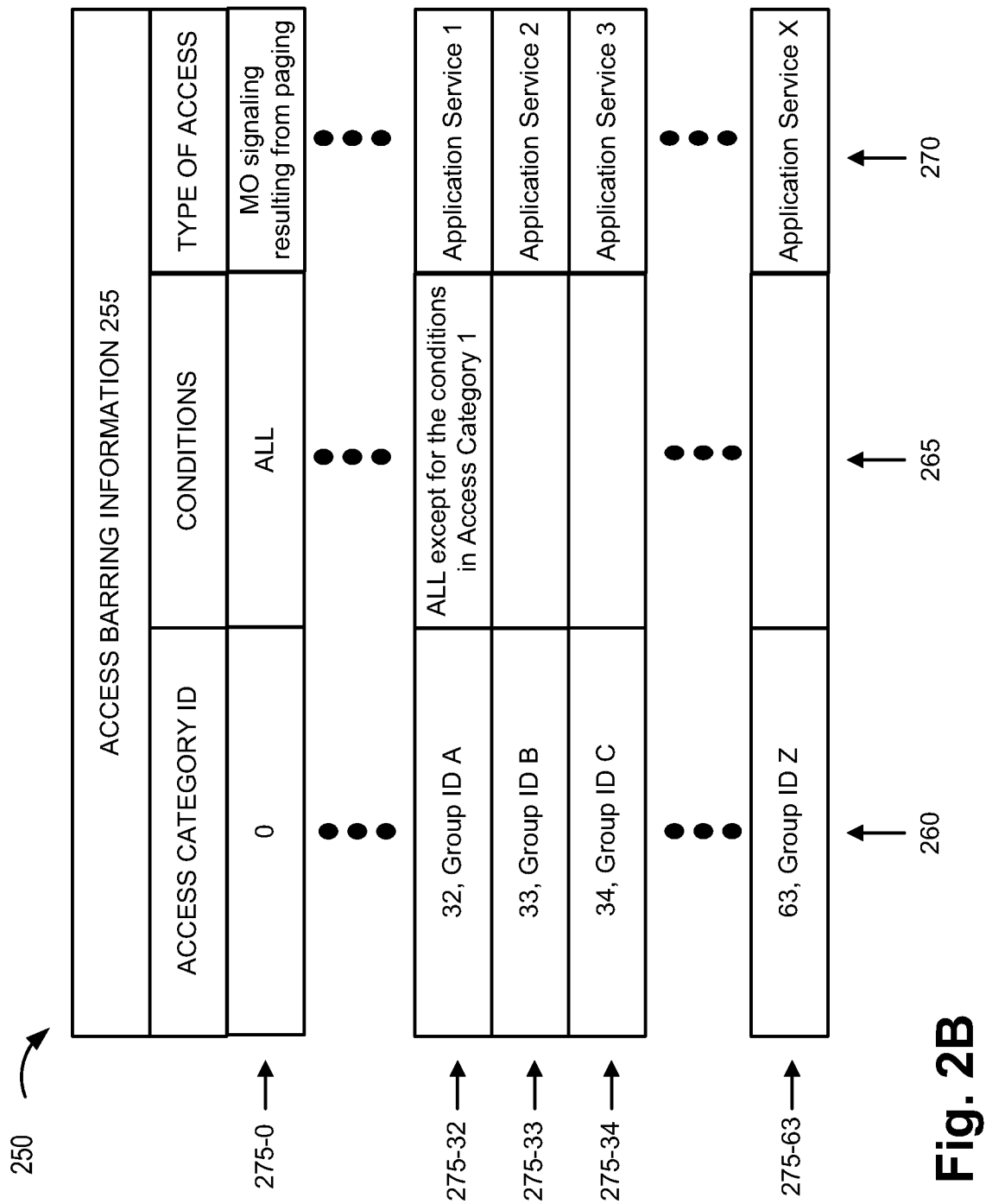
FIG. 2B is a diagram illustrating exemplary access barring information according to an exemplary embodiment of access control with differentiated service.

FIG. 2B is a diagram illustrating an exemplary embodiment of the access barring information of an exemplary embodiment of access control with differentiated service. For example, referring to a table 250 in FIG. 2B, exemplary access barring information 255 is illustrated. Table 300 may include an access category identifier field 260, a conditions field 265, and a type of access field 270. As further illustrated, table 300 includes entries 275-0 through 275-63 (also referred as entries 275, or individually or generally as entry 275) that each includes a grouping of fields 260, 265, and 270 that are correlated (e.g., a record, etc.). The access barring information 255 is illustrated in tabular form merely for the sake of description. In this regard, access barring information 255 may be implemented in a data structure different from a table (e.g., a list, a flat file, etc.), a database, or another type of structure. Additionally, values illustrated in field 260, field 265, and field 270 are exemplary. According to other embodiments, the values, strings, or instances of information stored in a field may be different.

Access category identifier field 260 may store information indicating access category identifier. According to various exemplary embodiments, some or all of the access category identifiers may include a first identifier and a second identifier, as described herein. For example, referring to entry 275-32, access category identifier field 260 illustrates a numerical string (e.g., "32") as the first identifier, and a group identifier A, as the second identifier. According to another example, referring to entry 275-0, access category identifier field 260 illustrates a single value (e.g., "0"). According to some exemplary embodiments, access category identifiers that include the first identifier and the second identifier may only pertain to access of end devices 130 via an NSA deployment. According to some exemplary embodiments, access category identifiers that include a single value may only pertain to access of end devices 130 via an SA deployment. According to other exemplary embodiments, single and dual identifiers associated with an access category identifier may be applicable to end devices 130 regardless of their access being via SA or NSA deployments.

Conditions field 265 may store information indicating a condition pertaining to end device 130. For example, the condition may specify a criterion of end device 130 to be satisfied for the correlated type of access. As an example, the condition may indicate a reason and/or a requirement for an access attempt by end device 130.

Type of access field 270 may store information indicating a type of radio access and/or reason for radio access from a perspective of end device 130. For example, type of access field 270 may indicate an application service. According to various exemplary implementations, the application service may be specified by category, sub-category, an individual application service, or another type of configurable grouping or nomenclature, for example. Additionally, or alternatively, type of access field 270 may store information indicating a performance metric value for a performance metric (e.g., a threshold value). Additionally, or alternatively, type of access field 270 may store information indicating a role of end device 130 (e.g., MO, mobile terminating (MT), etc.), type of data (e.g., signaling data, user plane data, control plane, protocol to which the data pertains (e.g., Radio Resource Control (RRC) protocol, Non-Access Stratum (NAS) protocol, or another type of protocol), a functional layer of a RAN), a procedure to which the data pertains (e.g., attachment procedure, NAS transport procedure, etc.), and/or other information that may characterize an aspect of the type of radio access.

According to other exemplary embodiments, table 300 may store additional, fewer, and/or different instances of access barring information 255 in support of access control with differentiated service, as described herein. According to an exemplary embodiment, access control with differentiated service may apply precedence rules for selecting an access category identifier when an access attempt matches more than one access category definition of access barring information 255.

Although not illustrated, access barring information 255 may include an access class information (e.g., which may correspond to 4G access barring) and/or an access identity information (e.g., which may correspond to the access identities of a 5G or future generation UAC) that pertains to end devices 130.

Referring back to FIG. 2A, based on the selection of the access barring information, RIC 208 may include logic that instructs access device 107 to transmit access barring information to end devices 130. For example, RIC 208 may instruct eNB 206, and eNB 206 may generate and broadcast an information block message (e.g., a system information block (SIB) message and/or a master information block (MIB) message) or other suitable message that includes the access barring information. End device 130 may receive and interpret the access barring information and operate according to such access barring information. According to other examples, end device 130 may receive the access barring information, but unable to decode the access barring information. Such inability to decode may indicate a barring (e.g., of a cell, etc.) to end device 130.

FIG. 3 is a diagram illustrating an exemplary process 300 of an exemplary embodiment of access control with differentiated service may be implemented. Referring to FIG. 3, RIC 208 may obtain information from one or multiple sources that allows RIC 208 to determine access barring information. For example, as illustrated in FIG. 3, RIC 208 may transmit requests 302, 304, 308 to and receive responses 302, 304, 308 from MEC server 214, eNB 206, and gNB 204. According to other exemplary implementations, RIC 208 may communicate with additional, different, and/or fewer network devices. Additionally, or alternatively, RIC 208 may receive or obtain information pertaining to access barring determinations without transmitting a request. According to an exemplary implementation, RIC 208 may obtain state information pertaining to resources and/or other types of information, as described herein, for example.

Based on the information, RIC 208 may analyze the information 310. For example, RIC 208 may evaluate the information to determine commensurate access barring parameters. RIC 208 may evaluate the information based on AI and/or ML logic. RIC 208 may also consider other information, such as priority of service pertaining to access classes and/or an access identities of end devices 130 in view of congestion levels. RIC 208 may further consider priorities pertaining to application services that may correlate to candidate access category identifiers included in access barring information 255, for example. For example, the application service may be a critical communication with high reliability and low latency.

Based on the analysis, RIC 208 may select 315 an access barring configuration. For example, RIC 208 may identify access and barring parameters to be enforced. RIC 208 may select access category identifiers that may be permitted and access category identifiers that may be barred from access. As further illustrated, RIC 208 may generate and transmit an access barring message 318 to an access device 107, such as eNB 206. According to various embodiments, access barring message 318 may include instructions or commands to eNB 206 for managing access barring and/or parameters or values of access barring information 255 that indicates access category identifiers to be barred or permitted access. For example, the access category identifiers may include first and second identifiers, as described herein.

eNB 206 may receive access barring message 318. Based on receiving the access barring message, eNB 206 may broadcast 321 access barring information. For example, eNB 206 may broadcast a SIB message, a MIB message, and/or another type of radio message, which includes access barring information, to end device 130. The access barring information may be implemented as a flag, an information element (IE), a bit, a parameter (e.g., UAC barring info, UAC barring factor, etc.) and/or another type of data instance, for example.

Based on receiving the access barring information, end device 130 may regulate 325 its access to radio access network 202. For example, end device 130 may store access class information and/or access identity information. According to some implementations, the access identity/access class information may be configured on a Subscriber Identification Module (SIM) card, an embedded SIM (eSIM), a Universal SIM (USIM), a Universal Integrated Circuit Card (UICC), an embedded UICC (eUICC), or another type of resident storage (e.g., future generation, proprietary, etc.) of end device 130. The access identity/access class information may indicate values ranging from 0-15, another numerical range, or may use a non-numerical nomenclature, for example.

End device 130 may determine permitted and barred access based on a reading or a decoding of the received access barring information. For example, end device 130 may establish an application service session with MEC server 214 via gNB 204 that pertains to a critical IoT application service 330. Additionally, or alternatively, end device 130 may be barred access by eNB 206, which may cause end device 130 to trigger a timer mechanism 335. Thereafter, end device 130 may re-attempt access and successfully establish an application service session with MEC server 214 via eNB 206 that pertains to a massive IoT application service 340.

FIG. 3 illustrates an exemplary embodiment of a process of access control with differentiated service, according to other exemplary scenarios, access control with differentiated service may perform additional operations, fewer operations, and/or different operations than those illustrated and described.

FIG. 4 is a diagram illustrating exemplary components of a device 400 that may be included in one or more of the devices described herein. For example, device 400 may correspond to access device 107, external device 117, core device 122, end device 130, gNB 204, eNB 206, MEC server 214, UPF/PGW 216, and/or other types of network devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to RIC 208, software 420 may include an application that, when executed by processor 410, provides a function and/or a process of access control with differentiated service, as described herein. According to another example, with reference to another type of access device 107, such as an eNB, software 420 may include an application that, when executed by processor 410, provides a function and/or a process of access control with differentiated service, as described herein. According to yet another example, with reference to end device 130, software 420 may include an application that, when executed by processor 410, provides a function and/or a process of access control with differentiated service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, core network 120, etc.). Thus, network devices described herein may be implemented as device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
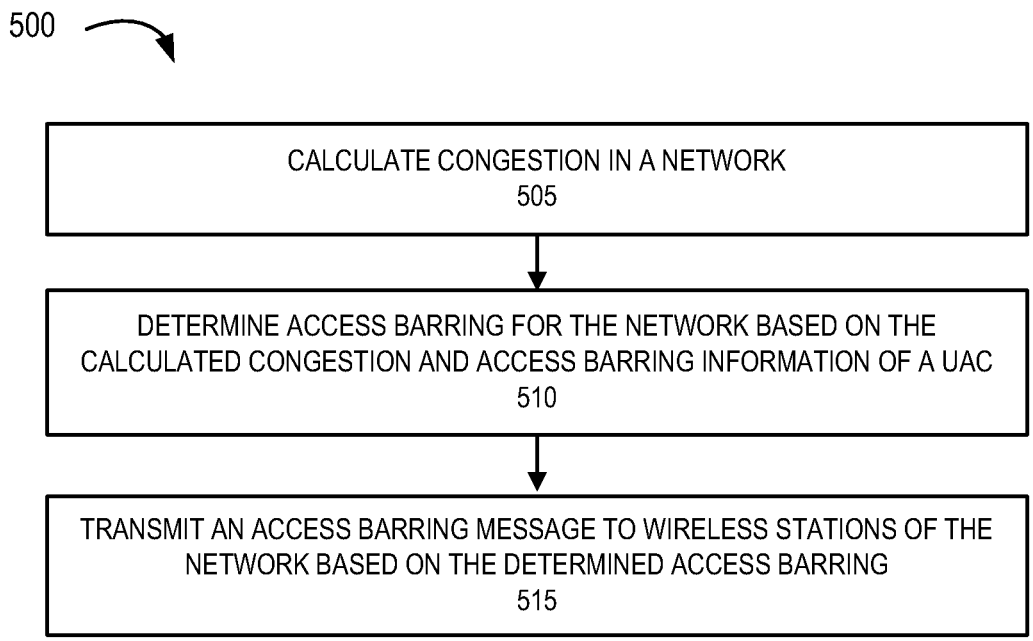
FIG. 5 is a flow diagram illustrating an exemplary process of an exemplary embodiment of access control with differentiated service.

FIG. 5 is a flow diagram illustrating an exemplary process 500 of an exemplary embodiment of access control with differentiated service. According to an exemplary embodiment, a controller device of wireless stations in a radio access network may perform a step of process 500. For example, the controller device may be a RIC or another type of similar functioning device. According to an exemplary implementation, processor 410 executes software 420 to perform the step of process 500, as described herein. Alternatively, the step may be performed by execution of only hardware.

In block 505, the controller device may calculate congestion in a network. For example, the controller device may obtain state information (e.g., current, predictive) that relate to resource utilization and other information, as described herein. The controller device may analyze and determine a congestion level.

In block 510, the controller device may determine access barring for the network based on the calculated congestion and access barring information of access control with differentiated service, as described herein. For example, the access barring information may include at least some access category identifiers, which may comprise first and second identifiers, as described herein. The first and second identifiers may identify at least some access categories of a UAC and may correlate to at least one of a type of access or a condition pertaining to an end device. According to various exemplary embodiments, the access categories of the UAC that may be identified by the first and second identifiers may or may not pertain to end devices that access the network via an NSA deployment. The access categories of the UAC that may be identified by the first and second identifiers may pertain to end devices subject to permitted or barred access. According to other exemplary embodiments, the first and second identifiers may correlate to at least one criterion other than a type of access or a condition pertaining to the end device. For example, the criterion may relate to time of day for access, characteristic of traffic (e.g., amount of data, burst versus non-burst, periodic versus aperiodic, etc.), one-way versus two-way traffic, or another type of configurable criterion.

In block 515, the controller device may transmit an access barring message to wireless stations of the network based on the determined access barring. For example, the access barring message may include a command and/or information indicating access barring parameters or configurations to be enforced. The access barring message may include an access category that may be identified by first and second identifiers, as described herein.

FIG. 5 illustrates an exemplary embodiment of a process of access control with differentiated service, however according to other exemplary embodiments, the access control with differentiated service may perform additional operations, fewer operations, and/or different operations than those illustrated and described.

Figure 6:
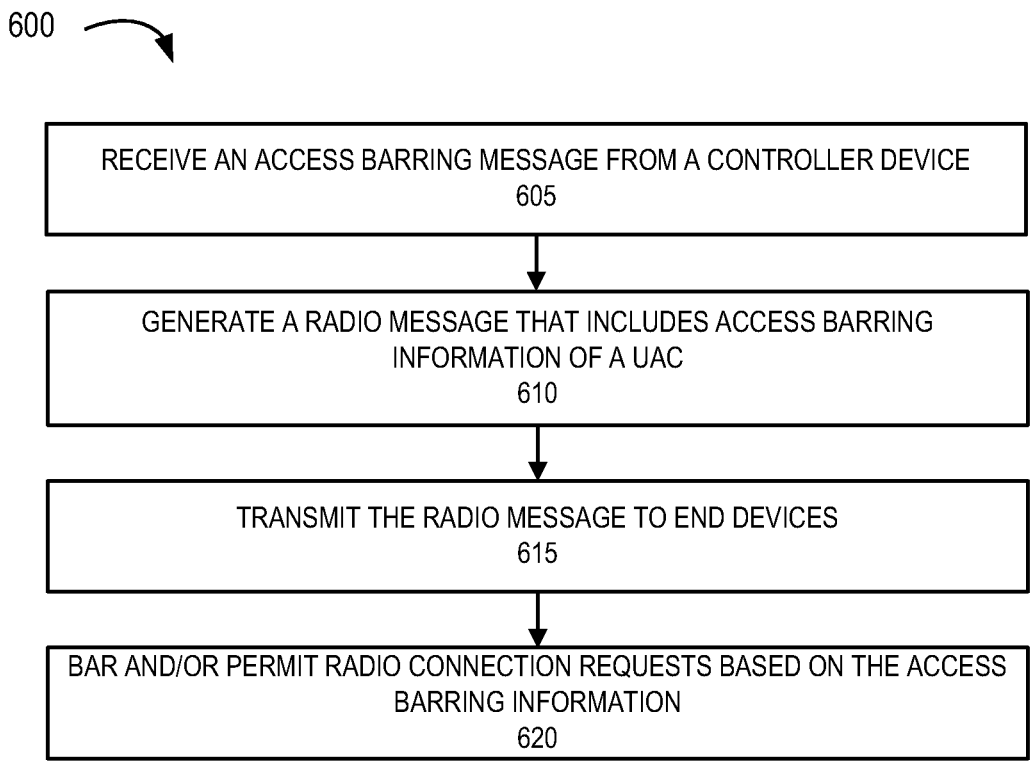
FIG. 6 is a flow diagram illustrating another exemplary process of an exemplary embodiment of the access control with differentiated service.

FIG. 6 is a flow diagram illustrating another exemplary process 600 of an exemplary embodiment of access control with differentiated service. According to an exemplary embodiment, access device 107 may perform a step of process 600. For example, access device 107 may be a wireless station of access network 105. According to an exemplary implementation, processor 410 executes software 420 to perform the step of process 600, as described herein. Alternatively, the step may be performed by execution of only hardware.

In block 605, a wireless station may receive an access barring message from a controller device. For example, an eNB or another type of wireless station of a radio access network, as described herein, may receive the access barring message from a RIC or similar functioning device. The access barring message may include an instruction, a command, and/or access barring information parameters and/or information pertaining to access barring.

In block 610, the wireless station may generate a radio message that includes access barring information of access control with differentiated service, as described herein. For example, the access barring information may include at least some access category identifiers, which may comprise first and second identifiers, as described herein. The first and second identifiers may identify at least some access categories of a UAC and may correlate to at least one of a type of access or a condition pertaining to an end device. According to various exemplary embodiments, the access categories of the UAC that may be identified by the first and second identifiers may or may not pertain to end devices that access the network via an NSA deployment. According to an exemplary implementation, the radio message may be a SIB message and/or a MIB message. The access categories of the UAC that may be identified by the first and second identifiers may pertain to end devices subject to permitted or barred access. According to other exemplary embodiments, the first and second identifiers may correlate to at least one criterion other than a type of access or a condition pertaining to the end device. For example, the criterion may relate to time of day for access, characteristic of traffic (e.g., amount of data, burst versus non-burst, periodic versus aperiodic, etc.), one-way versus two-way traffic, or another type of configurable criterion.

In block 615, the wireless station may transmit the radio message to end devices 130. For example, the wireless station may broadcast the radio message to end devices 130.

In block 620, the wireless station (after transmission) may bar and/or permit radio connection requests with end devices 130 based on the access barring information.

FIG. 6 illustrates an exemplary embodiment of a process of access control with differentiated service, according to other exemplary embodiments, the access control with differentiated service may perform additional operations, fewer operations, and/or different operations than those illustrated and described.

Figure 7:
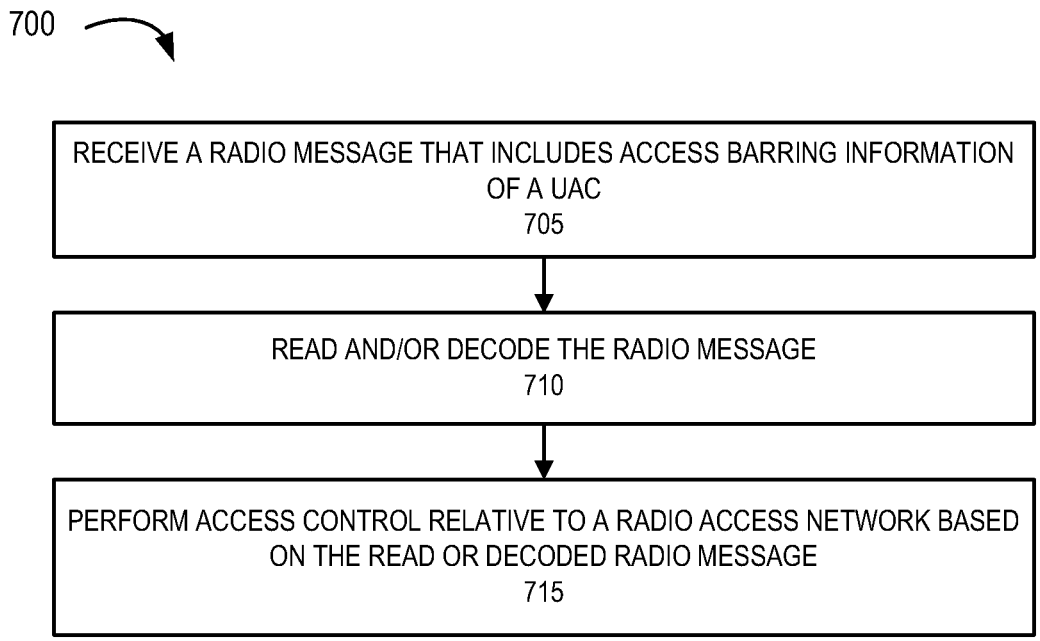
FIG. 7 is a flow diagram illustrating yet another exemplary process of an exemplary embodiment of the access control with differentiated service.

FIG. 7 is a flow diagram illustrating another exemplary process 700 of an exemplary embodiment of the access control with differentiated service. According to an exemplary embodiment, end device 130 may perform a step of process 700. According to an exemplary implementation, processor 410 executes software 420 to perform the step of process 700, as described herein. Alternatively, the step may be performed by execution of only hardware.

In block 705, an end device may receive a radio message that includes access barring information. For example, the access barring information may include at least some access category identifiers, which may comprise first and second identifiers, as described herein. The first and second identifiers may identify at least some access categories of a UAC and may correlate to at least one of a type of access or a condition pertaining to an/the end device.

According to various exemplary embodiments, the access categories of the UAC that may be identified by the first and second identifiers may or may not pertain to end devices that access the network via an NSA deployment. According to an exemplary implementation, the radio message may be a SIB message and/or a MIB message. The access categories of the UAC that may be identified by the first and second identifiers may pertain to end devices subject to permitted or barred access. According to other exemplary embodiments, the first and second identifiers may correlate to at least one criterion other than a type of access or a condition pertaining to the end device. For example, the criterion may relate to time of day for access, characteristic of traffic (e.g., amount of data, burst versus non-burst, periodic versus aperiodic, etc.), one-way versus two-way traffic, or another type of configurable criterion.

In block 710, the end device may read and/or decode the radio message.

In block 715, the end device may perform access control relative to a radio access network based on the read and/or decoded radio message. For example, the end device may determine a permitted access or a barred access relative to a connection request.

FIG. 7 illustrates an exemplary embodiment of a process of access control with differentiated service, according to other exemplary embodiments, access control with differentiated service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 5, 6, and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    receiving, by a wireless station of a radio access network, an access barring message;
    generating, by the wireless station based on the access barring message, a radio message that includes access barring information including at least one access category identifier, which comprises a first identifier that identifies a Long Term Evolution (LTE) access class value and a second identifier that identifies a public land mobile network (PLMN) or a subscriber group, such that the at least one access category identifier correlates to a Fifth Generation (5G) access category value that identifies at least one access category of a unified access control and correlates to at least one criterion; and
    transmitting, by the wireless station, the radio message to end devices.

2. The method of claim 1, wherein the at least one access category of the unified access control pertains to end device-access via a standalone (SA) deployment.

3. The method of claim 1, wherein the at least one access category of the unified access control pertains to end device-access via a non-standalone (NSA) deployment.

4. The method of claim 1, wherein the at least one criterion indicates an application service.

5. The method of claim 1, wherein the at least one criterion indicates a performance metric threshold value.

6. The method of claim 1, wherein the at least one criterion indicates criteria including a type of access and a condition pertaining to an end device to which the at least one access category applies.

7. The method of claim 1, further comprising:
    barring, by the wireless station after the transmitting, at least one radio connection for at least one of the end devices based on the access barring information.

8. The method of claim 1, wherein the wireless station is an evolved Node B, a radio unit (RU), or a distributed unit (DU), and part of a non-standalone deployment with another wireless station.

9. A network device comprising:
    a processor configured to:
        receive an access barring message, wherein the network device is a wireless station of a radio access network;
        generate, based on the access barring message, a radio message that includes access barring information including at least one access category identifier, which comprises a first identifier that identifies a Long Term Evolution (LTE) access class value and a second identifier that identifies a public land mobile network (PLMN) or a subscriber group, such that the at least one access category identifier correlates to a Fifth Generation (5G) access category value that identifies at least one access category of a unified access control and correlates to at least one criterion; and transmit the radio message to end devices.

10. The network device of claim 9, wherein the at least one access category of the unified access control pertains to end device-access via a standalone (SA) deployment.

11. The network device of claim 9, wherein the at least one access category of the unified access control pertains to end device access via a non-standalone (NSA) deployment.

12. The network device of claim 9, wherein the at least one criterion indicates criteria including a type of access and a condition pertaining to an end device to which the at least one access category applies.

13. The network device of claim 9, wherein the at least one criterion indicates an application service.

14. The network device of claim 9, wherein the at least one criterion indicates a performance metric threshold value.

15. The network device of claim 9, wherein the processor is further configured to:

bar, after the transmission, at least one radio connection for at least one of the end devices based on the access barring information.

16. The network device of claim 9, wherein the wireless station is an evolved Node B, a radio unit (RU), or a distributed unit (DU), and part of a non-standalone deployment with another wireless station.

17. A non-transitory computer-readable storage medium storing instructions executable by a processor of a wireless station of a radio access network, which when executed cause the processor to:

receive an access barring message;

generate, based on the access barring message, a radio message that includes access barring information including at least one access category identifier, which comprises a first identifier that identifies a Long Term Evolution (LTE) access class value and a second identifier that identifies a public land mobile network (PLMN) or a subscriber group, such that the at least one access category identifier correlates to a Fifth Generation (5G) access category value that identifies at least one access category of a unified access control and correlates to at least one criterion; and transmit the radio message to end devices.

18. The non-transitory computer-readable storage medium of claim 17, wherein the at least one access category of the unified access control pertains to end device-access via a standalone (SA) deployment.

19. The non-transitory computer-readable storage medium of claim 17, wherein the instructions comprise further instructions, which when executed, cause the processor to:

bar, after the transmission, at least one radio connection for at least one of the end devices based on the access barring information.

20. The non-transitory computer-readable storage medium of claim 17, wherein the at least one access category of the unified access control pertains to end device-access via a non-standalone (NSA) deployment.

* * * * *